United States Patent [19]

Weinhrauch et al.

[11] Patent Number: 4,973,139
[45] Date of Patent: Nov. 27, 1990

[54] AUTOMOTIVE HEAD-UP DISPLAY

[75] Inventors: Martin Weinhrauch, Woodland Hills; John J. Ferrer, Los Angeles; Mao-Jin Chern, Rancho Palos Verdes; Ronald G. Hegg; Matthew J. Van Leeuwen, both of Los Angeles; Steven A. Stringfellow, Hermosa Beach; William J. Wainwright, Rancho Palos Verdes; Harry J. King, Woodland Hills, all of Calif.

[73] Assignee: Hughes Aircraft Company, Los Angeles, Calif.

[21] Appl. No.: 335,174

[22] Filed: Apr. 7, 1989

[51] Int. Cl.$^5$ .......................... G02F 1/13; G09G 3/02
[52] U.S. Cl. .................................. 350/345; 350/331 R; 350/338; 350/174; 350/279; 350/284; 340/705
[58] Field of Search ............... 350/174, 171, 172, 283, 350/284, 330, 331 R, 338, 339 D, 167, 345, 279; 340/705

[56] References Cited

U.S. PATENT DOCUMENTS

| | | | |
|---|---|---|---|
| 4,040,727 | 8/1977 | Ketchpel | 350/338 X |
| 4,099,841 | 7/1978 | Ellis | 350/174 X |
| 4,298,249 | 11/1981 | Gloor et al. | 350/338 |
| 4,310,219 | 1/1982 | Jaccard | 350/339 D X |
| 4,613,200 | 9/1986 | Hartman | 350/174 X |
| 4,621,898 | 11/1986 | Cohen | 350/276 R |
| 4,740,780 | 4/1988 | Brown et al. | 350/174 X |
| 4,831,366 | 5/1989 | Iino | 350/174 X |

FOREIGN PATENT DOCUMENTS

| | | | |
|---|---|---|---|
| 0007039 | 1/1980 | European Pat. Off. | 350/174 |
| 0229876 | 7/1987 | European Pat. Off. | 340/705 |
| 0012450 | 1/1986 | Japan | 340/705 |
| 1418891 | 1/1972 | United Kingdom | 350/174 |
| 88/09942 | 12/1988 | World Int. Prop. O. | 350/174 |

Primary Examiner—Stanley D. Miller
Assistant Examiner—Huy K. Mai
Attorney, Agent, or Firm—Leonard A. Alkov; Wanda K. Denson-Low

[57] ABSTRACT

A vehicle head-up instrument display including a light emitting image source for producing imaging illumination, optical apparatus for directing the imaging illumination to the inside surface of a vehicle windshield, and a combiner comprising a portion of the windshield or a coating applied to the windshield partially reflects the imaging illumination to produce a virtual image viewable by the driver. The image source and optical apparatus are enclosed in a housing having an elliptical cylindrical transparent cover for transmitting the imaging illumination to the windshield and for directing sunlight and skylight reflections therefrom away from the driver's eyes.

12 Claims, 2 Drawing Sheets

AUTOMOTIVE HEAD-UP DISPLAY

BACKGROUND OF THE INVENTION

The disclosed invention is directed generally to a head-up virtual image display for a vehicle for displaying instrumentation information, and is more particularly directed to a vehicle head-up dynamic instrument display which provides for a virtual image instrument display at or ahead of the windshield of a vehicle.

Vehicle instrumentation information is conventionally displayed on an instrument panel of the vehicle that is below the windshield, which requires that the driver divert his or her eyes from viewing the outside scene to viewing the panel instrumentation, for example, to check vehicle speed or the status of warning lights. Such diversion requires shifting of the field of view as well as refocusing, and can be a cause of inattention to the changing outside scene.

In recognition of the desirability of providing instrumentation read-outs that are within the line of sight of a pilot scanning the outside scene, head-up displays have been utilized in military aircraft to provide instrumentation and other readouts. However, such head-up display systems are complex and expensive, and have capabilities not required in an automobile or similar vehicle.

SUMMARY OF THE INVENTION

It would therefore be an advantage to provide a head-up display for vehicles which produces a virtual image that is viewable by the vehicle operator without diversion of vision from the outside scene.

Another advantage would be to provide a head-up display for vehicles which produces virtual images at or ahead of the windshield and provides for normal visibility through the windshield.

The foregoing and other advantages are provided by the invention in a head-up display system that includes an image source for producing imaging illumination, optical apparatus for directing the illumination provided by said source to the windshield, and a combiner including a portion of the windshield for partially reflecting the directed imaging illumination to produce a virtual image of the image source viewable by the operator of the vehicle.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION

Figure 1:
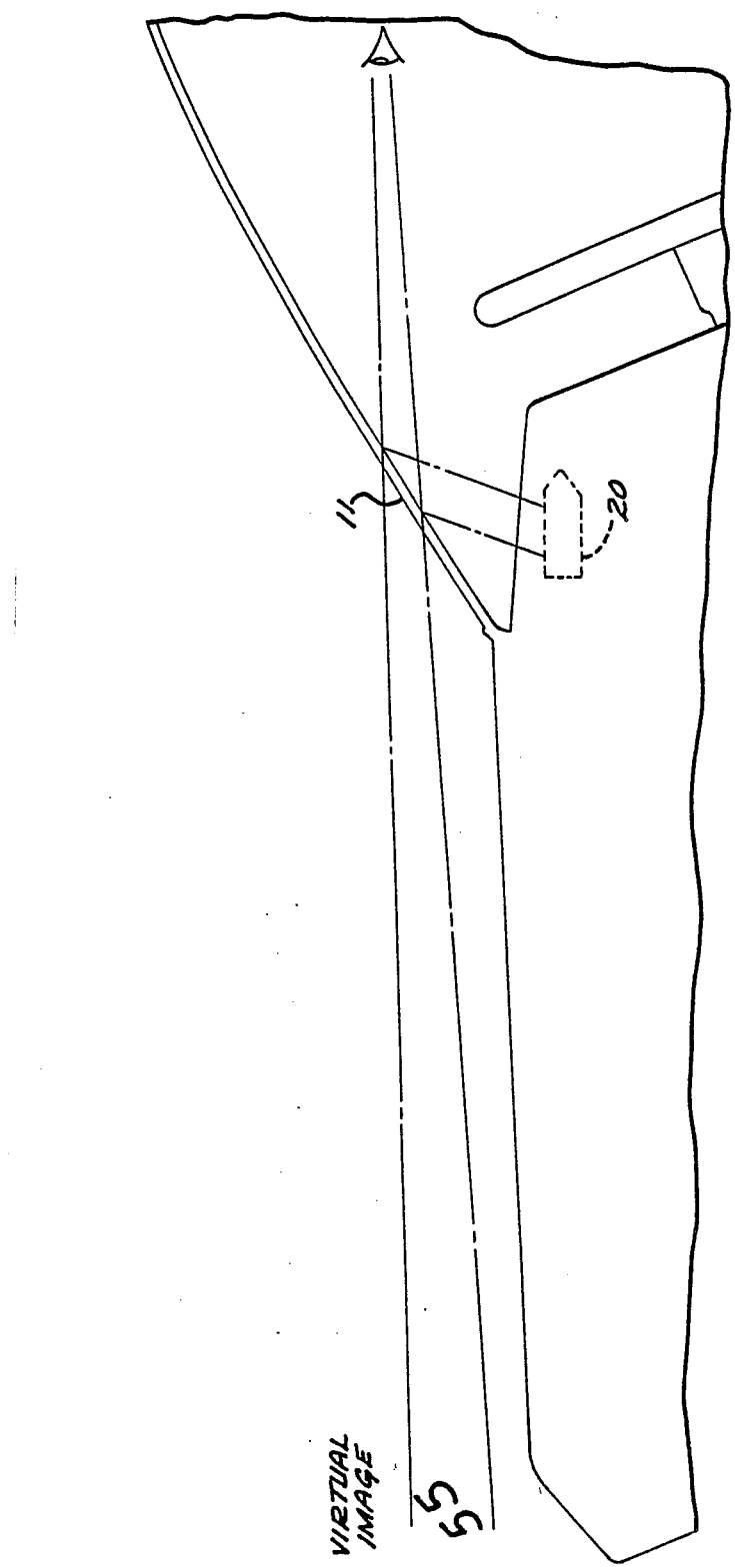
FIG. 1 is a schematic illustration of the major components of the disclosed vehicle head-up display system.

In the following detailed description and in the several figures of the drawing, like elements are identified with like reference numerals.

Referring now to FIG. 1, shown therein is a head-up vehicle instrument display system that includes an imaging illumination source 20 and a combiner element 11 that comprises a portion of the vehicle windshield, an automobile windshield for example. The imaging illumination source 20 can be on the dashboard or within the dashboard with an appropriate opening for passage of the imaging illumination. The combiner element 11 partially reflects the imaging illumination toward the driver so as to produce a virtual image of a light emitting image source within the imaging illumination source at a location ahead of the vehicle windshield, for example.

While the disclosed embodiments are described in the context of a vehicle such as an automobile, it should be appreciated that the term vehicle encompasses other vehicles that include a windshield or similar transparent protective device. The term vehicle also encompasses vehicles that do not have windshields, in which case the combiner would comprise a transparent panel, for example.

By way of illustrative example, the combiner element 11 comprises a portion of the inside surface of the windshield, which pursuant to the Fresnel reflection laws partially reflects the imaging illumination provided by the imaging illumination source 20. By way of specific example, the imaging illumination is incident on the windshield inside surface at about 65 degrees relative to normal, which provides for reflection of about 15 to 20 percent of the incident illumination.

The combiner element 11 can also comprise a metallic coating that does not reduce light transmission below the pertinent federal standard, presently 70%, or a multilayer dielectric reflecting coating. Such coatings would be applied to either the inside surface of the windshield or between the layers of the windshield. While application of the coating to the inside surface would provide for a better image, the coating would be more susceptible to physical damage. While a coating between the layers of the windshield would be protected from physical damage, reflection off the inside surface would produce a ghost image, which could be reduced in intensity by an antireflection coating on the inside surface, but that would be susceptible to physical damage.

As a further alternative, the reflection element 11 can be a reflection hologram.

Figure 2:
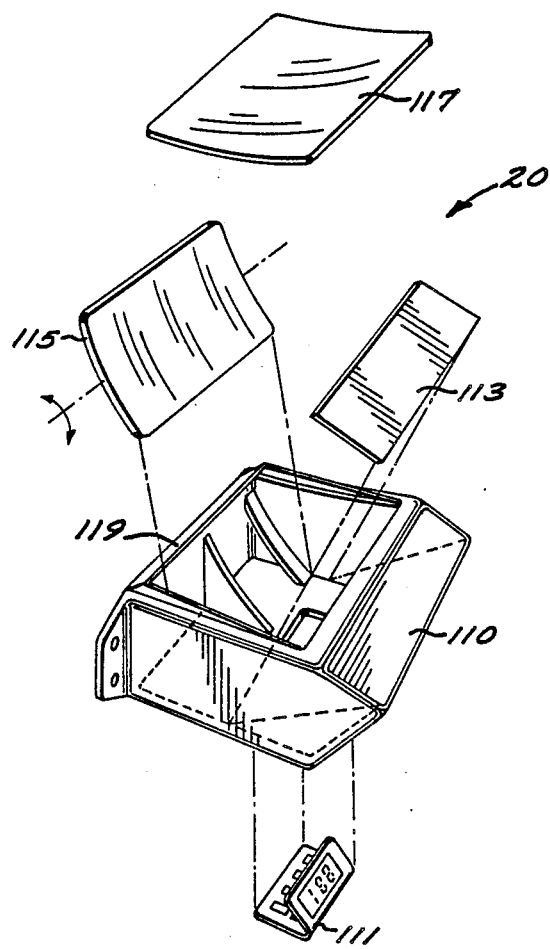
FIG. 2 is a schematic exploded view of the imaging illumination source of the head-up display system of FIG. 1.

Referring now to FIG. 2, shown therein is a detail view of the imaging illumination source 20 which includes an image source 111 comprising for example a high intensity vacuum fluorescent display (VFD) such as those commercially available from Futaba Corporation of America, Plymouth, Mich. A VFD commonly includes segmented elements that are selectively energizable to form light emitting numerical and/or alphabetical symbols, or other indicia. Inputs to the image source 111 are provided by appropriate transducing circuitry to display selected vehicle and/or engine operating parameters and conditions.

A fold mirror 113 secured in the housing 110 relays the imaging illumination from the image source 111 to an off-axis mirror 115, which in turn relays the imaging illumination through a transparent cover 117 to the combiner element 11. As discussed more fully herein, the mirror 115 can be fixedly secured in the housing or can be tiltable about a lateral axis "A." While a relay mirror 113 is included, it should be appreciated that depending on the location of the image source 111 in the imaging illumination source 20 and the location of the imaging illumination source 20 relative to the windshield, the relay mirror might not be necessary. The fold mirror 113 can be planar or can have some optical power such as a cylindrical surface to compensate for windshield shape or the power of the mirror 115.

It should be appreciated that with an odd number of reflecting elements (e.g., three), the image source 111 must adapted to be a mirror image of the intended virtual image. With an even number of reflecting elements (e.g., two), the image source 111 would be adapted to be oriented the same as the intended virtual image.

The mirror 115 is generally concave and magnifies the image relayed to the combiner element 11, and is preferably an aspheric element. The particular curvatures of the mirror 115 can be defined so as to compensate for the distortion introduced by the off-axis configuration of the mirror 115 and the distortion introduced by the curvatures of the windshield.

The optical elements are configured so that the operator can view the entire displayed virtual image over a region in space called an eyebox. A relatively large eyebox is desired to allow normal head motion of the driver, and also to encompass the variation in head location of the driver population (i.e., tall or short drivers). To achieve a relatively large eyebox, a large mirror 115 can be utilized, which in turn would result in a larger package for the imaging illumination source 20. Alternatively, a smaller mirror 115 which is selectively tiltable about the lateral axis "A" can provide a vertically adjustable eyebox location while keeping the imaging illumination source package small. For each different driver, the small tiltable mirror 115 would be adjusted to a fixed tilt so that the center of the eyebox is appropriate for the driver's head location and at such fixed tilt would provide a sufficiently large eyebox to permit normal driver head motion. By way of specific example, the mirror 115 could be controllably tilted by apparatus similar to that utilized for remotely controlled automobile side view mirrors.

Although the combiner in the foregoing illustrative examples comprises a windshield or a coating applied thereto, it should be appreciated that for vehicles that do not include a windshield the combiner can comprise a transparent panel or a coating applied thereto.

While the image source 111 is specifically disclosed as a vacuum fluorescent display, other spectrally broad sources can be utilized as the image source 111, including segmented and matrix addressable liquid crystal displays (LCDs) which for example can be obtained Seiko of Japan. By way of specific example, an appropriate LCD would present negative graphics if directly viewed, wherein most of the display would be dark and only the segments or pixels comprising the desired display indicia would be "on" or transparent. The LCD would include a backlighting scheme whereby light would be transmitted substantially only by the segments or pixels that are on or transparent.

More particularly as to an LCD, it could include an incandescent bulb and collimating elements for providing collimated illumination. Preferably, the illumination elements would be designed so that in combination with the aspheric 115 the image of the bulb filament would nominally re-image at the center of the eye box (which is the region in space where the viewers eyes are located to view the virtual image). Depending on the desired eye box size, the LCD could include a diffuser, a thin ground glass layer for example, on the image side of the LCD for providing a slight amount of diffusion.

Since liquid crystal displays emit polarized light, the polarization of the illumination output of liquid crystal displays could be controlled to enhance reflection off the combiner element 11.

For the illustrative example of the combiner element 11 comprising the inside surface of the windshield and an incident angle of about 65 degrees, the reflection efficiency for S-polarized light is much greater than for P-polarized light. Thus, the LCD utilized as the image source 111 could be configured to emit S-polarized light for maximum light efficiency. However, it should be noted that polarized sunglasses are commonly P-polarized, and would cause the head-up display image to dim considerably.

The disclosed imaging illumination source 20 is advantageously an enclosed structure which prevents potentially contaminating and damaging dirt, dust and physical objects from entering the source. However, it should be noted that dazzling or veiling reflections from the transparent cover 117 to the driver should be avoided. By way of specific example as to installation of the head-up display system in an automobile having an angled windshield, the top surface of the transparent cover 117 can be a concave portion of an elliptically shaped cylinder having its longitudinal axis extending laterally and defined by two foci respectively located (a) behind and below the top edge of a light trap 119 located along the top front edge of the imaging illumination source 20 and nominally parallel to the windshield, and (b) above the windshield and behind the focus at the light trap, such that when this focus is optically folded by the vehicle windshield it will lie below the eyebox. In other words, the elliptical cylinder that would include the top surface of the transparent cover 117 would be defined by the foregoing foci.

With the elliptical cylindrical top surface, the pertinent sunlight and skylight reflections are focused in directions away and down from the operator's eyes. In particular, light incident on the transparent cover from above the focus at the light trap (i.e., skylight and sunlight) and reflected by the transparent cover will be reflected by the windshield to a location below the eyebox. Light incident on the transparent cover from below the focus at the light trap (i.e., from the inside surface of the light trap) and reflected by the transparent cover will be reflected by the windshield into and above the eyebox. Thus, the operator sees only the inside surface of the light trap, which is preferably matte black so that the viewed image thereof is a dark area.

The foregoing has been a disclosure of a head-up vehicle instrument display system that provides a virtual image that is viewable by the driver without significant diversion from viewing the outside scene. The head-up display system is easily manufactured and incorporated in vehicles such as automobiles, and can be implemented without special processing of the vehicle windshields.

Although the foregoing has been a description and illustration of specific embodiments of the invention, various modifications and changes thereto can be made by persons skilled in the art without departing from the scope and spirit of the invention as defined by the following claims.

What is claimed is:

1. A head-up display for a vehicle having a windshield, comprising:
   an image source for providing imaging illumination;
   a combiner including a portion of the windshield; and
   an off-axis aspheric mirror for reflecting the imaging illumination to said combiner and for compensating distortions due to the off-axis configuration and the curvature of the windshield portion of the combiner, wherein said aspheric mirror is tiltably adjustable to accommodate the vertical location of the vehicle operator's head.

2. The head-up display of claim 1 wherein said image source comprises a vacuum fluorescent display.

3. The head-up display of claim 1 wherein said image source comprises a liquid crystal display.

4. The head-up display of claim 3 wherein said liquid crystal display provides illumination that is polarized to enhance reflection from the inside surface of the windshield.

5. The head-up display of claim 1 further including a transparent cover which transmits the imaging illumination directed to the windshield, said transparent cover being shaped to direct sunlight and skylight reflections therefrom away from the eyes of the vehicle operator.

6. There head-up display of claim 1 wherein said combiner further comprises a reflection coating applied to the windshield.

7. A head-up display for a vehicle comprising:
an image source for providing imaging illumination;
a combiner for receiving imaging illumination to produce in response thereto a virtual image of said image source; and
an off-axis aspheric mirror for reflecting imaging illumination to said combiner from said image source, and for compensating distortions due to the off-axis configuration and any curvature in said combiner, wherein said aspheric mirror is tiltably adjustable to accommodate the vertical location of the vehicle operator's head.

8. The head-up display of claim 7 wherein said image source comprises a vacuum fluorescent display.

9. The head-up display of claim 7 wherein said image source comprises a liquid crystal display.

10. The head-up display of claim 9 wherein said liquid crystal display provides illumination that is polarized to enhance reflection from the inside surface of the windshield.

11. The head-up display of claim 7 further including a transparent cover which transmits the imaging illumination directed to the windshield, said transparent cover being shaped to direct sunlight and skylight reflections therefrom away from the eyes of the vehicle operator.

12. There head-up display of claim 7 wherein said combiner further comprises a reflection coating applied to the windshield.

* * * * *